United States Patent
Park et al.

(10) Patent No.: US 11,630,482 B2
(45) Date of Patent: *Apr. 18, 2023

(54) DISPLAY APPARATUS

(71) Applicant: SAMSUNG ELECTRONICS CO., LTD., Suwon-si (KR)

(72) Inventors: Dongkyu Park, Suwon-si (KR); Jin Park, Suwon-si (KR); Sungha Son, Suwon-si (KR); Wooyoung Cheon, Suwon-si (KR); Kihun Kim, Suwon-si (KR); Seongsoo Kim, Suwon-si (KR); Sungjoo Kim, Suwon-si (KR); Jongbae Kim, Suwon-si (KR); Doosoon Park, Suwon-si (KR); Wonkyu Park, Suwon-si (KR); Jinyoung Shin, Suwon-si (KR); Mingyu Yoon, Suwon-si (KR); Seungho Lee, Suwon-si (KR); Wonhong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,411

(22) Filed: Apr. 28, 2022

(65) Prior Publication Data
US 2022/0253094 A1 Aug. 11, 2022

Related U.S. Application Data

(63) Continuation of application No. 17/082,789, filed on Oct. 28, 2020, now Pat. No. 11,347,259.

(30) Foreign Application Priority Data

Dec. 31, 2019 (KR) .................. 10-2019-0179383

(51) Int. Cl.
G06F 1/16 (2006.01)
G02F 1/1333 (2006.01)
G06F 1/18 (2006.01)

(52) U.S. Cl.
CPC ...... G06F 1/1605 (2013.01); G02F 1/133308 (2013.01); G06F 1/1637 (2013.01); G06F 1/182 (2013.01)

(58) Field of Classification Search
CPC . G06F 1/1605; G06F 1/1637; G02F 1/133308
See application file for complete search history.

(56) References Cited

U.S. PATENT DOCUMENTS 6,175,396 B1 * 1/2001 Kim .................. G02F 1/133308
361/679.21
7,463,314 B2 * 12/2008 Lee .................. G02F 1/133308
349/58

(Continued)

FOREIGN PATENT DOCUMENTS

CN 207476054 U 6/2018
KR 10-2010-0019704 A 2/2010

(Continued)

OTHER PUBLICATIONS

International Search Report and Written Opinion dated Mar. 15, 2021, issued by the International Searching Authority in International Application No. PCT/KR2020/016163 (PCT/ISA/210 and 237).

*Primary Examiner* — Nidhi Thaker
(74) *Attorney, Agent, or Firm* — Sughrue Mion, PLLC

(57) ABSTRACT

A display apparatus is provided. The display apparatus includes a display; a main body on which the display is mounted; a cover; a mounting member configured to separably mount the main body to the mounting member; and a guide member disposed at a back surface of the main body, the guide member including a plate member and side- (Continued)

surface members extending from opposite side surfaces of the plate member, wherein each of the side-surface members has an inclined shape.

14 Claims, 11 Drawing Sheets

(56) References Cited

U.S. PATENT DOCUMENTS

| | | | | |
|---|---|---|---|---|
| 8,050,023 B2* | 11/2011 | Lee | ............ | H05K 5/02 |
| | | | | 455/575.1 |
| 8,434,251 B2* | 5/2013 | Lee | ............ | H05K 5/02 |
| | | | | 40/780 |
| 8,437,120 B2* | 5/2013 | Lee | ............ | H05K 5/0217 |
| | | | | 361/679.01 |
| 8,861,190 B2* | 10/2014 | Kim | ............ | H05K 5/02 |
| | | | | 361/679.01 |
| 9,195,270 B2* | 11/2015 | Liu | ............ | F16B 5/0664 |
| 9,836,080 B2 | 12/2017 | Park et al. | | |
| 2002/0016106 A1 | 2/2002 | Okayasu et al. | | |
| 2005/0057124 A1 | 3/2005 | Maruta | | |
| 2009/0225254 A1 | 9/2009 | Matsuzawa et al. | | |
| 2013/0279730 A1 | 10/2013 | Tanaka | | |
| 2014/0217097 A1 | 8/2014 | Maeda | | |
| 2015/0163574 A1 | 6/2015 | Hamadate | | |
| 2016/0309597 A1 | 10/2016 | Oh et al. | | |
| 2017/0164078 A1 | 6/2017 | Yoon et al. | | |
| 2018/0103305 A1 | 4/2018 | Wang | | |
| 2018/0283676 A1 | 10/2018 | Coo | | |

FOREIGN PATENT DOCUMENTS

| | | |
|---|---|---|
| KR | 10-2015-0069802 A | 6/2015 |
| KR | 10-2016-0139832 A | 12/2016 |

* cited by examiner

DISPLAY APPARATUS

CROSS-REFERENCE TO RELATED APPLICATION

This application is a continuation application of U.S. patent application Ser. No. 17/082,789, filed on Oct. 28, 2020, which is based on and claims priority under 35 U.S.C. § 119 to Korean Patent Application No. 10-2019-0179383, filed on Dec. 31, 2019, in the Korean Intellectual Property Office, the disclosure of which is incorporated by reference herein in its entirety.

BACKGROUND

1. Field

The disclosure relates to a display apparatus and, more particularly, to a display apparatus which includes a guide member providing a movement route of a tool for removal of a cover, when the cover is separated from the display apparatus.

2. Description of Related Art

Recently, when mounting a cover on a display apparatus, a coupling structure, which is not exposed to the outside, is increasingly used to form a clean outside of the display apparatus. In addition, in order for a sound device of the display apparatus to provide a three-dimensional (3D) sound, attempts at providing sound to various directions by disposing a plurality of sound devices at an edge of the display apparatus are being made.

However, when separating a cover from the display apparatus by using a tool for removal, there have been problems such as the sound device disposed at an edge of the display apparatus being damaged by the tool for removal or a tool being caught and incapable of movement or being damaged by the sound device.

SUMMARY

In accordance with an aspect of the disclosure, a display apparatus includes: a display; a main body on which the display is mounted; a cover; a mounting member configured to separably mount the main body to the mounting member; and a guide member disposed at a back surface of the main body, the guide member including a plate member and side-surface members extending from opposite side surfaces of the plate member, wherein each of the side-surface members has an inclined shape.

The plate member may include a plurality of penetration grooves, and the mounting member may be positioned in the plurality of penetration grooves to mount the cover to the main body.

The display apparatus may further a speaker, and the plate member may include a plurality of receiving grooves, and the speaker is disposed on the plurality of receiving grooves.

The speaker may include a speaker unit which outputs sound; and an enclosure accommodating the speaker unit.

The cover may include a plurality of slits in an area corresponding to the side-surface members of the guide member.

The display apparatus may further include an additional speaker outputting sound in a direction different from a direction of sound output by the speaker.

A back surface of the speaker and a back surface of the plate member may be coplanar.

The speaker further may include a metal plate disposed between a front surface of the speaker unit and the enclosure.

Each of the side-surface members may have the inclined shape in which a surface of the side-surface member facing the cover is inclined toward the back surface the main body.

Each of the side-surface members may be inclined in a continuous slope extending from a first end contacting a back surface of the plate member to a second end contacting the back surface of the main body.

A width of each of the side-surface members may be narrower than a width of the plate member.

The guide member may be disposed adjacent to an upper edge of the main body along a horizontal direction of the main body.

The display apparatus may further include a plurality of mounting members including the mounting member, wherein the cover may be connected to the main body by the plurality of mounting members, and a plurality of guide members respectively positioned at each of the plurality of mounting members.

The display apparatus may further include a magnetic layer disposed between the side-surface member and the main body.

The main body may include a wire disposed along an edge of the back surface of the main body, the cover may include a fastening member disposed at a position corresponding to the wire, and the wire and the fastening member may be snap coupled to each other.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

The example embodiments are described herein to assist in the understanding of the disclosure, and it is to be understood that the disclosure is not limited to the embodiments disclosed below, and that embodiments may be implemented to various forms and various modifications may be applied thereto. However, in the disclosure below, if it is determined that the detailed description on a related known function or element unnecessarily obscures the gist of the disclosure, the detailed description and illustration thereof may be omitted. In addition, the accompanying drawings are not illustrated in the actual scale to assist in the understanding of the disclosure, but are illustrated so that the dimensions of some elements are exaggerated.

The terms used in the disclosure and the claims are general terms identified in consideration of the functions of various embodiments of the disclosure. However, these terms may vary depending on intention, legal or technical interpretation, emergence of new technologies, and the like of those skilled in the related art. In addition, some arbitrary terms may be used. The terms may be interpreted to a meaning defined in the disclosure, and unless otherwise specified, the terms may be understood based on the overall contents and technological common sense of those skilled in the related art.

It is to be understood that the expressions such as "comprise," "may comprise," "include," or "may include" are used herein to designate a presence of a corresponding characteristic (e.g., an element such as a number, a function, an operation, or a component), and not to preclude a presence or a possibility of additional characteristics.

The disclosure describes elements that are necessarily in each embodiment of the disclosure, but embodiments are not necessarily limited thereto. Accordingly, some elements may be modified or omitted, and other elements may be included. In addition, the elements may be disposed broken up in apparatuses independent from one another.

Furthermore, although the accompanied drawings and embodiments of the disclosure have been described in detail with reference to the descriptions disclosed in the accompanying drawings, it is to be understood that the disclosure is not limited by the embodiments.

The disclosure will be described in greater detail below with reference to the accompanying drawings.

The disclosure provides a display apparatus with a guide member providing a movement route of a tool for removal when a cover is removed from a display apparatus.

Figure 1:
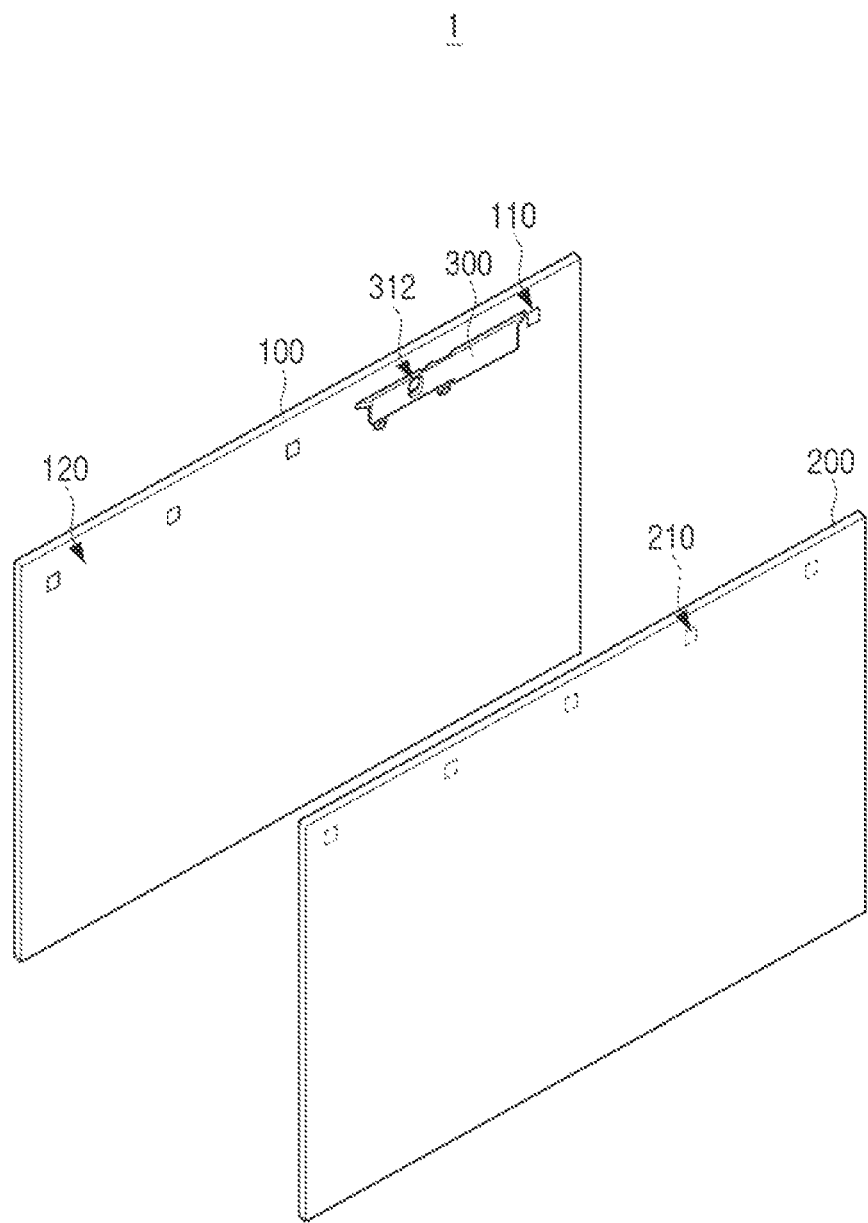
FIG. 1 is a perspective view illustrating a state in which a cover is separated from a display apparatus according to an embodiment.

FIG. 1 is a perspective view illustrating a state in which a cover 200 is separated from a display apparatus 1 according to an embodiment. Referring to FIG. 1, the display apparatus 1 according to an embodiment may include a main body 100, a cover 200, and a guide member 300.

The display apparatus 1 may include an analog television (TV), a digital TV, a three dimensional (3D)-TV, a smart TV, a light emitting diode (LED) TV, an organic light emitting diode (OLED) TV, a plasma TV, a quantum dot light emitting diode (QLED) TV, and/or a monitor. In addition, the display apparatus 1 may include an electronic blackboard with a display, and/or a digital signage device.

The main body 100 may be mounted with a display on a front surface thereof and may accommodate a light guide plate, a light source, a backlight unit, an optical sheet, or the like therein.

On the back surface 120 of the main body 100, a mainboard, a power board, a speaker, or the like may be installed, and a plurality of first mounting members 110 for coupling with the cover 200 may be disposed along an edge of the back surface 120. The configuration of the first mounting member 110 will be described in detail below.

On the back surface 120 of the main body 100, the cover 200 may be positioned at an opposite side of the front surface to which the display is mounted.

The cover 200 may be disposed to cover the back surface 120 of the main body 100, and prevent a plurality of electronic components installed at the back surface 120 from being exposed to the outside of the display apparatus 1.

The cover 200 may include a second mounting member 210 to be disposed at a position corresponding to the first mounting member 110. Based on the first mounting member 110 and the second mounting member 210 being coupled, the cover 200 may be mounted to the main body 100 to be separable from the main body 100. The configuration of the second mounting member 210 will be described in greater detail below.

The guide member 300 may be disposed at an edge of the back surface 120 of the main body 100. The guide member 300 may be disposed in a horizontal direction of the main body 100 to be adjacent to an upper edge of the main body as shown in FIG. 1.

A plurality of guide members 300 may be provided spaced apart at a predetermined distance.

The guide member 300 may include penetration grooves 312 penetrating in a thickness direction of the guide member 300. The guide member 300 may be disposed so that positions of the penetration grooves 312 correspond to the first mounting member 110.

Accordingly, even if the guide member 300 is disposed between the main body 100 and the cover 200, the first mounting member 110 and the second mounting member 210 may easily couple regardless of the presence of the guide member 300. The configuration and arrangement of the guide member 300 will be described in greater detail below.

Figure 2:
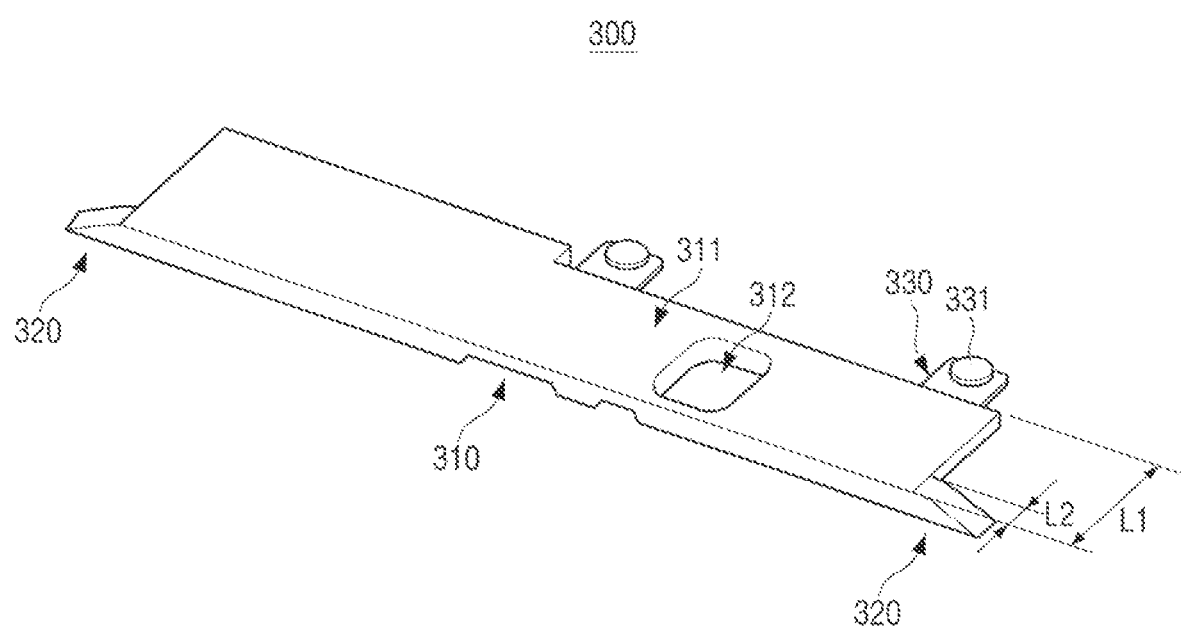
FIG. 2 is a perspective view illustrating a guide member according to an embodiment.

FIG. 2 is a perspective view illustrating a guide member 300 according to an embodiment. Referring to FIG. 2, the guide member 300 may include a plate member 310, a side-surface member 320, and a fixing member 330.

The plate member 310 may be positioned at the center of the guide member 300, and may include one or more penetration grooves 312 which penetrate in the thickness direction of the plate member 310.

The plate member 310 may be formed in a rough cuboid form with a predetermined thickness, but is not necessarily limited thereto.

The side-surface member 320 may be disposed at both side surfaces of the plate member 310 and formed to have an inclined shape. The side-surface member 320 may have a downwardly inclined shape toward the direction of the back-surface 120 of the main body 100.

In addition, the width L2 of the side-surface member 320 may be narrower than the width L1 of the plate member 310.

In addition, a magnetic layer may be disposed between the side-surface member 320 and the main body 100. The guide member 300 may be more substantially coupled to the back-surface 120 of the main body 100 by a magnetic force acting on the magnetic layer.

The magnetic layer may be a thin structure with a thin thickness, and may be attached to a front-facing part of the side-surface member 320 (i.e., a part facing the back surface 120 of the main body 100. The magnetic layer may include at least one from among Co, Fe, Ni, Ta, B, Zr, Cr, V, AI, Be, Ti, Zn, Hf, Pd, Pt, Bi, and Ga, but is not necessarily limited thereto.

A plurality of fixing members 330 may be provided at one side of the plate member 310, and may fix the guide member 300 to the back surface 120 of the main body 100 with a fixing device 331.

The fixing device 331 may be an elastic member like rubber, and may fix the guide member 300 to the back-surface 120 of the main body 100 in an inserting method to grooves formed consecutively on the fixing member 330 and the back surface 120 of the main body 100, but the method of fixing the guide member 300 to the back surface 120 of the main body 100 is not necessarily limited thereto.

The guide member 300 may be disposed on the back surface 120 of the main body 100 such that the first mounting member 110 and the second mounting member 210 are positioned in the penetration grooves 312.

That is, if the first mounting member 110 and the second mounting member 210 are positioned in the penetration grooves 312 penetrating the guide member 300, even if the guide member 300 is disposed between the main body 100 and the cover 200, the cover 200 may be easily mounted to the back surface 120 of the main body 100.

Figure 3:
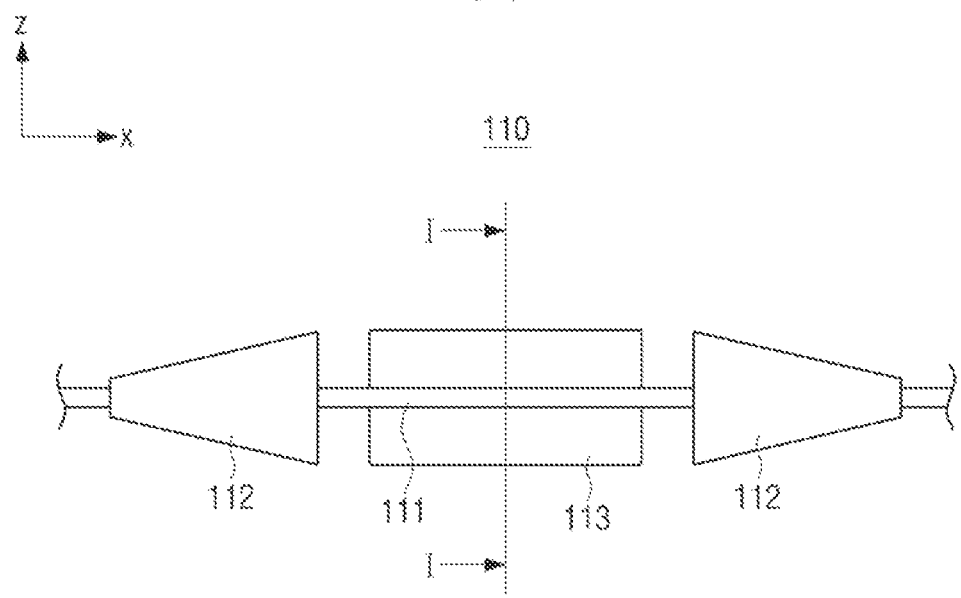
FIG. 3 is a top plan view illustrating a first mounting member according to an embodiment.
Figure 4:
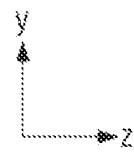
FIG. 4 is a partial cross-sectional view taken along line I-I in FIG. 3.
Figure 4:
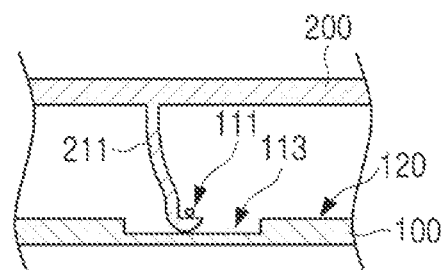

FIG. 3 is a top plan view illustrating a first mounting member 110 according to an embodiment of the disclosure. FIG. 4 is a partial cross-sectional view taken along line I-I in FIG. 3.

Referring to FIGS. 3 to 4, the first mounting member 110 may include a wire 111, a wire holder 112, and a mounting groove 113. The second mounting member 210 may be formed as a fastening member 211 in a hook form. The cover 200 being mounted to be separable from the main body 100 by using the first mounting member 110 and the second mounting member 210 will be described in greater detail below.

The mounting groove 113 may be a groove having a predetermined depth in the thickness direction of the main body 100 on the back surface 120 of the main body 100.

A plurality of wire holders 112 may be disposed and spaced apart by a predetermined distance around the mounting groove 113 on the back surface 120 of the main body 100.

The wire holder 112 may fix the wire 111 while maintaining the tension of the wire 111 to a predetermined level.

The wire 111 may be disposed along the edge of the back surface 120 of the main body 100, and the wire holder 112 may fix the wire 111 by being disposed on the back surface 120 of the main body 100.

The wire 111 may be formed of a metal material, and may have a linear shape with the cross-section being in a circular shape, but is not necessarily limited thereto.

A first end of the fastening member 211 may be connected to the cover 200, and a second end may be snap coupled with the wire 111 by entering through the mounting groove 113. The second end of the fastening member 211 formed in a hook shape may be caught by the wire 111, and accordingly, the cover 200 may be separably mounted to the main body 100.

That is, based on the cover 200 being mounted to the main body 100 through snap coupling, the separating of the cover 200 mounted to the main body 100 may become more convenient. In addition, because the coupling structure has not been exposed to the outside of the display apparatus 1, an effect of the exterior of the display apparatus 1 becoming clean may be expected.

In the above, the cover 200 being mounted to be separable from the main body 100 by using the first mounting member 110 and the second mounting member 210 has been illustrated and described with reference to FIGS. 3 to 4. However, in another example, the first mounting member 110 and the second mounting member 210 may be formed with the positions thereof interchanged, and various modifications may be made in various forms in which a snap coupling may be achieved.

Figure 5:
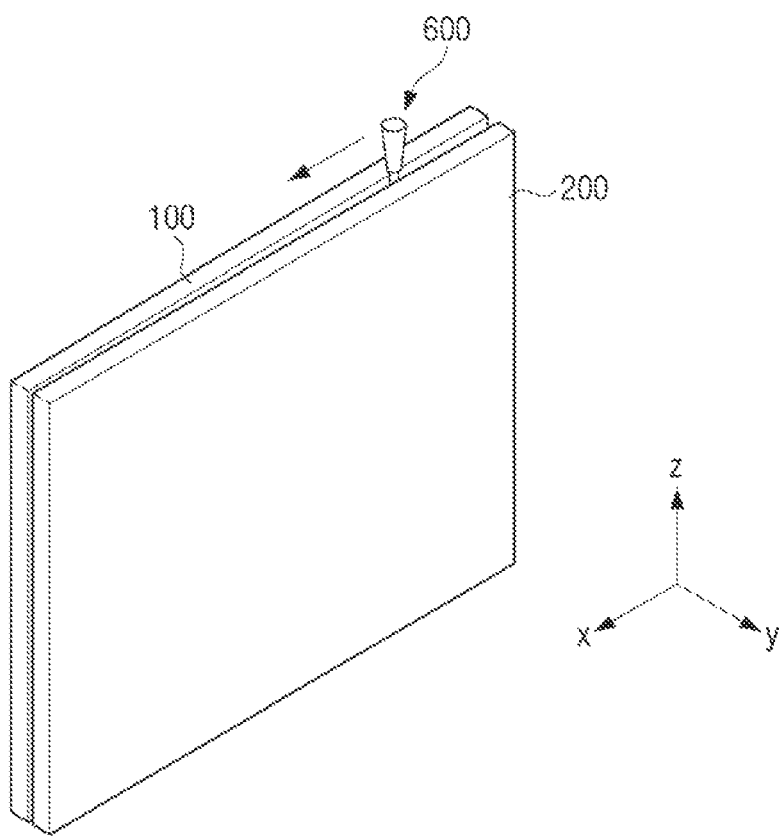
FIG. 5 is a perspective view illustrating a movement direction of a tool when a cover mounted to a main body is separated according to an embodiment.

FIG. 5 is a perspective view illustrating a movement direction of a tool 600 when a cover 200 is separated from a main body 100 by using the tool 600 according to an embodiment.

Referring to FIG. 5, the user may separate the cover 200 mounted to the back surface 120 of the main body 100 by using the tool 600. The tool 600 may, while being inserted in a gap between the main body 100 and the cover 200, move along the edge of the display apparatus 1 like the illustrated arrow in FIG. 5. Based on the tool 600 moving, the coupling of the first mounting member 110 and the second mounting member 210 mounted to the cover 200 may be released.

Accordingly, the gap between the main body 100 and the cover 200 may be widened, and the cover 200 may be separated from the main body 100. The tool 600 may be any tool sufficient enough to be insertable in the gap between the main body 100 and the cover 200, and may be a jig having a long shape for disassembling, but there is no limit to the type thereof.

Figure 6:
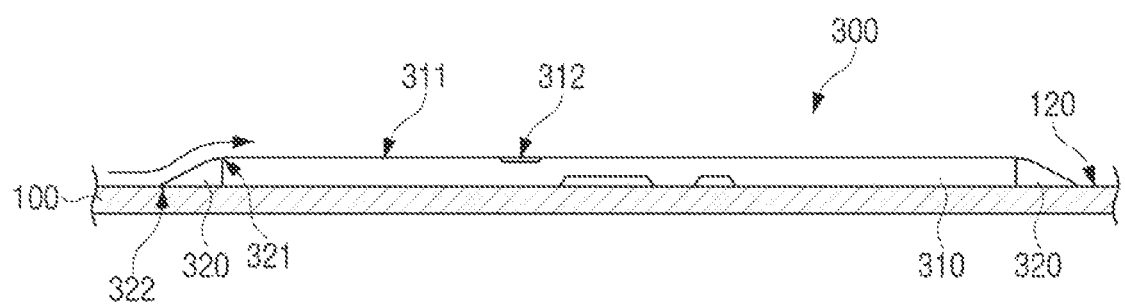
FIG. 6 is a side view illustrating a movement direction of a tool when a tool passes through a guide member disposed at a back-surface of a main body according to an embodiment.

FIG. 6 is a side view illustrating a movement direction of a tool 600 when a tool 600 passes through a guide member 300 disposed at a back surface 120 of a main body 100 according to an embodiment.

Referring to FIG. 6, the tool 600 may move along the back surface 120 of the main body 100 and move to the back surface 311 of the plate member 310 along the side-surface member 320 like the direction of the arrow.

As described above, because the side-surface member 320 may include an inclined shape, and may be formed downwardly inclined in the direction of the back surface 120 of the main body 100, the tool 600 may easily move to a back surface 311 of the plate member 310 in the same route as the shape of the side-surface member 320.

That is, the guide member 300 on both sides of which the side-surface member 320 is disposed may provide a route for the tool 600 to move. Accordingly, a case of the tool 600 not being able to move by being caught on the guide member 300 may be prevented, and damage of the speaker 400 and the like which may be accommodated inside the guide member, which will be described below, may be prevented.

In addition thereto, the first end 321 of the side-surface member 320 may be in contact with the back surface 311 of the plate member 310 in a continuous slope, and the second end 322 may be in contact with the back surface 120 of the main body 100 in a continuous slope.

Accordingly, based on the tool 600 moving from the back surface 120 of the main body 100 to the back surface 311 of the plate member 310, the tool 600 may be able move more smoothly to/from the first end 321 and the second end 322 of the side-surface member 320.

In addition, based on the tool 600 moving along the back surface 311 of the plate member 310, the tool 600 may pass to the back part of the penetration grooves 312 formed on the plate member 310. The tool 600 may release the snap coupling between the first mounting member 110 and the second mounting member 210 positioned on the penetration groove 312 while passing the back part of the penetration groove 312.

That is, as described above, even if the guide member 300 is disposed at the back surface of the main body 100, the first mounting member 110 and the second mounting member 210 may still easily release the coupling between the first mounting member 110 and the second mounting member 210 because the first mounting member 110 and the second mounting member 210 may be positioned on the penetration groove 312 that penetrates the guide member 300.

Figure 7:
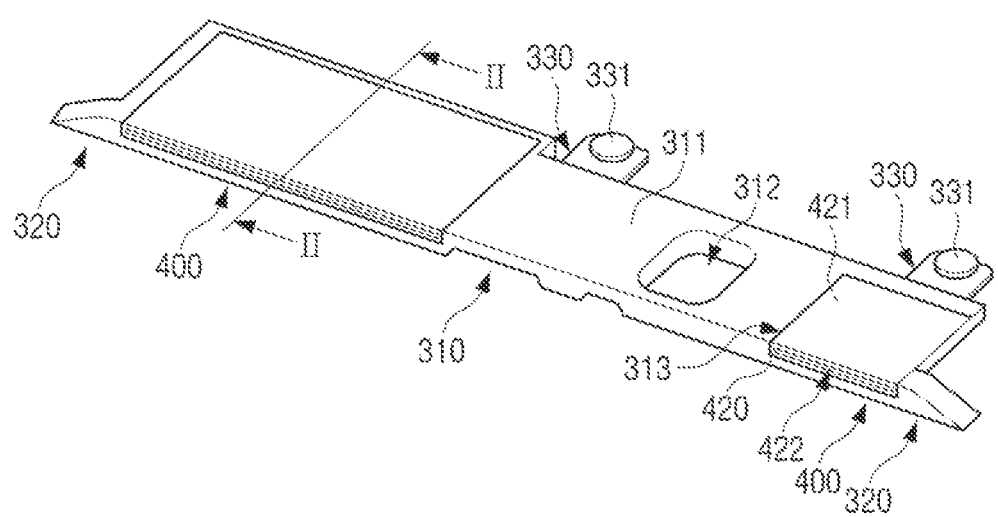
FIG. 7 is a perspective view illustrating a guide member to which a speaker is disposed according to an embodiment.
Figure 8:
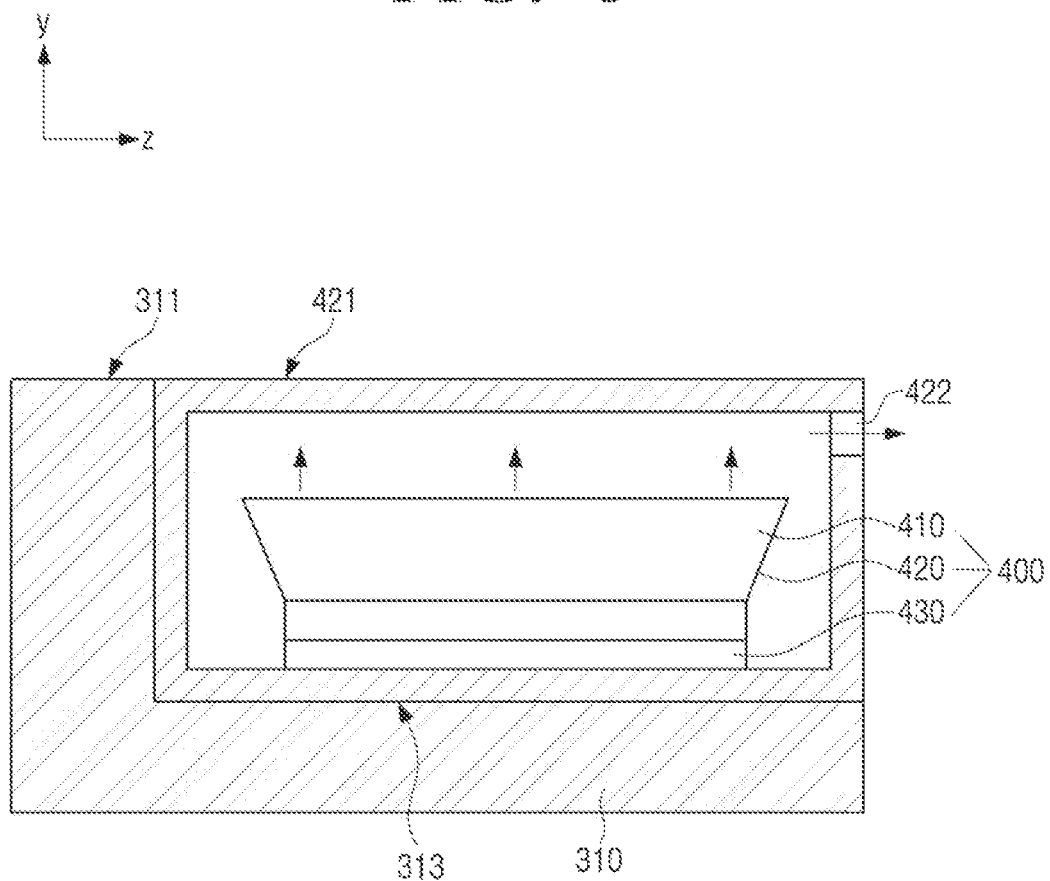
FIG. 8 is a partial cross-sectional view taken along line II-II in FIG. 7.

FIG. 7 is a perspective view illustrating a guide member 300 to which a speaker 400 is disposed according to an embodiment. FIG. 8 is a partial cross-sectional view taken along line II-II in FIG. 7.

Referring to FIGS. 7 and 8, the configurations of the guide member 300 to which the speaker 400 is disposed and the speaker 400 according to an embodiment may be described, and with respect to the configurations identical with the above-described embodiments, like reference numerals will be designated and descriptions thereof may be omitted.

Referring to FIG. 7, the guide member 300 may include receiving grooves 313 having a predetermined depth in the plate member 310, and the speaker 400 may be disposed on the receiving grooves 313.

A plurality of receiving grooves 313 and a plurality of speakers 400 may be provided on the plate member spaced apart from one another.

As the cover 200 is being separated from the display apparatus 1, because the speaker 400 is disposed in the receiving grooves 313 of the guide member 300, a case of the tool for removal 600 being caught on the speaker and obstructing the movement of the tool for removal 600, or the speaker 400 being damaged may be prevented.

The back surface 421 of the speaker 400 and the back surface 311 of the plate member 310 may have the same height. In other words, the back surface 421 of the speaker 400 may be coplanar with the back surface 311 of the plate member 310. Accordingly, the tool 600 may move smoothly along the back surface 311 of the plate member 310 formed without the step and the upper-surface of the speaker 400.

Referring to FIG. 8, the speaker disposed on the receiving grooves 313 may include a speaker unit 410, an enclosure 420, and a metal plate 430.

The speaker unit 410 may provide sound toward (y-axis direction) the back surface 421 of the enclosure 420. However, the sound provision direction of the speaker unit 410 is not limited thereto, and the speaker unit 410 may provide sound in various directions.

The speaker unit may include a yoke, a magnet, a damper, a diaphragm, and the like.

The enclosure 420 may accommodate the speaker unit 410, and the gap 422 may be formed toward the width direction (z-axis direction) of the plate member 310.

The enclosure 420 may guide the sound provided in the speaker unit 410 to be output in the width direction (z-axis direction) of the plate member 310 passing through the gap 422.

However, the gap 422 of the enclosure 420 is not limited to this arrangement, and the gap 422 may be formed in various directions based on the sound output direction desired by the user.

As described above, the back surface 421 of the enclosure 420 may have the same height as the back surface 11 of the plate member 310 so as not to have a step with the back surface 311 of the plate member 310.

The metal plate 430 may be disposed between the lower-surface of the speaker unit 410 and the enclosure 420. A flux may be leaked to the outside based on the characteristics of the thin speaker unit, and the metal plate 430 may use the flux leaked from the speaker unit 410 to increase a negative pressure of the sound provided from the speaker unit 410.

Figure 9:
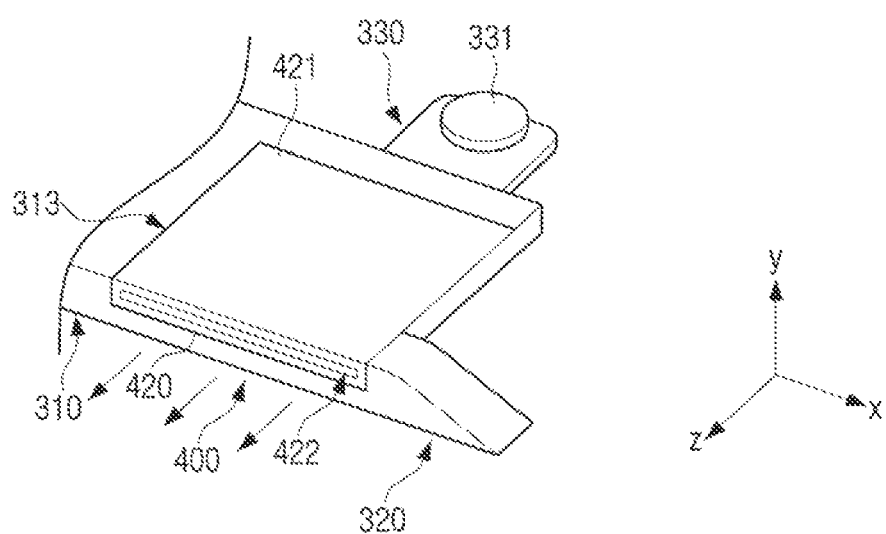
FIG. 9 is a perspective view illustrating an output direction of sound viewed from an outside of a guide member according to an embodiment.
Figure 10:
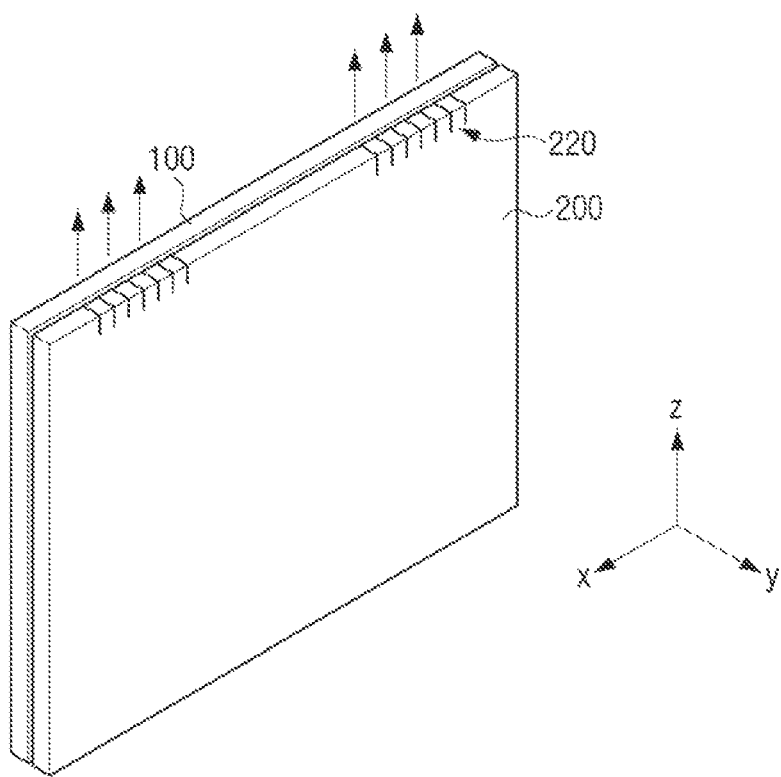
FIG. 10 is a perspective view illustrating an output direction of sound viewed from an outside of a display apparatus according to an embodiment.

FIG. 9 is a perspective view illustrating an output direction of sound viewed from an outside of a guide member 300 according to an embodiment. FIG. 10 is a perspective view illustrating an output direction of sound viewed from an outside of a display apparatus 1 according to an embodiment.

Referring to FIGS. 9 to 10, as described above, the speaker 400 may output sound toward a width direction (z-axis direction) of the plate member 310 to the gap 422 of the enclosure 420.

In addition, the cover 200 may include a plurality of slits 220 in the area corresponding to the side-surface of the guide member 300, and the sound output from the speaker 400 may be radiated to the outside of the display apparatus 1 through the plurality of slits 220.

As described above, because the guide member 300 may be disposed at the edge of the back surface 120 of the main body 100, the speaker 400 which is disposed on the receiving grooves 313 of the guide member 300 may radiate sound in various directions according to the position of the guide member 300.

In the drawings, the sound is illustrated as being output only to a top side direction of the display apparatus 1, but the sound may be output to any one from among a top side, a bottom side, a left side and a right side of the display apparatus 1 based on the position of the guide member 300. Accordingly, the sound quality and dimensionality of the sound may be enhanced, and a surround effect may be expected.

Figure 11:
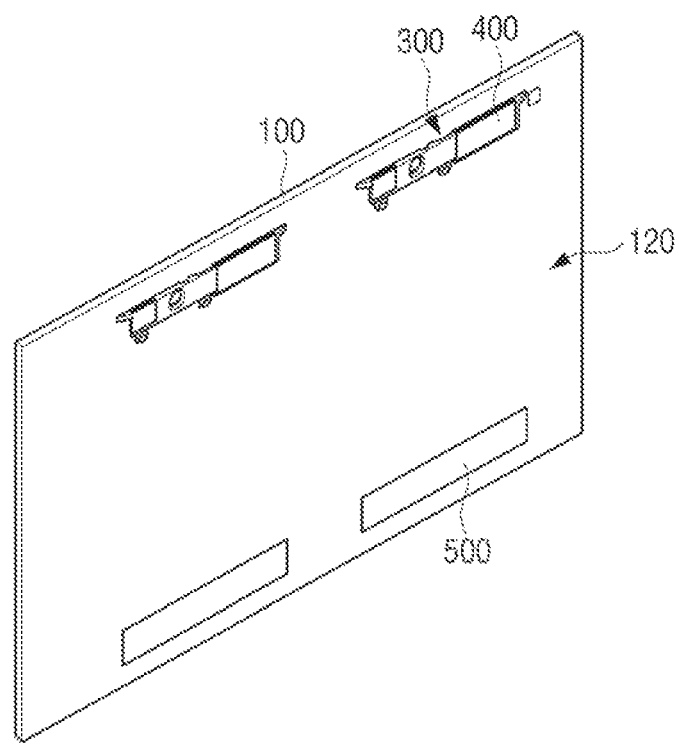
FIG. 11 is a perspective view of a main body to which an additional speaker is mounted to a back-surface of a main body according to an embodiment.

FIG. 11 is a perspective view of a main body 100 to which an additional speaker 500 is mounted to a back surface 120 of a main body 100 according to an embodiment.

Referring to FIG. 11, the additional speaker 500 may be disposed at a lower end edge of the back surface 120 of the main body 100, but is not necessarily limited thereto. A plurality of additional speakers 500 may be provided, and may output sound in a different direction from the speaker 400.

For example, the speaker 400 and the additional speaker 500 may output sound to the top side and the bottom side of the display apparatus 1, respectively. Accordingly, rather than having only the speaker 400 that outputs sound in one direction, by having the additional speaker 500 that output sound to a different direction, the sound quality and dimensionality of sound may be enhanced and the surround effect may be expected.

While the disclosure has been illustrated and described with reference to various embodiments thereof, the disclosure is not limited to the specific embodiments described, and it will be understood by those skilled in the art that various changes in form and details may be made therein without departing from the spirit and scope of the disclosure.

What is claimed is:

1. A display apparatus comprising: a display; a main body on which the display is mounted; a cover; a mounting member configured to separably mount the main body to the cover; and a guide member disposed at a back surface of the main body, the guide member comprising a plate member and side-surface members extending from opposite side surfaces of the plate member, wherein each of the side-surface members has an inclined shape, wherein each of the side-surface members has the inclined shape in which an entire surface of the side-surface member facing the cover is inclined toward the back surface of the main body.

2. The display apparatus of claim 1, wherein each of the side-surface members is inclined in a continuous slope extending from a first end contacting a back surface of the plate member to a second end contacting the back surface of the main body.

3. The display apparatus of claim 1, wherein a width of each of the side-surface members is narrower than a width of the plate member.

4. The display apparatus of claim 1, wherein the guide member is disposed adjacent to an upper edge of the main body along a horizontal direction of the main body.

5. The display apparatus of claim 1, further comprising:
   a plurality of mounting members including the mounting member, wherein the cover is connected to the main body by the plurality of mounting members; and
   wherein the display apparatus comprises a plurality of guide members respectively positioned at each of the plurality of mounting members.

6. The display apparatus of claim 1, further comprising a magnetic layer disposed between the side-surface members and the main body.

7. The display apparatus of claim 1, wherein the main body comprises a wire disposed along an edge of the back surface of the main body,
   wherein the cover comprises a fastening member disposed at a position corresponding to the wire, and
   wherein the wire and the fastening member are snap coupled to each other.

8. A display apparatus comprising: a display; a main body on which the display is mounted; a cover; a mounting member configured to separably mount the main body to the cover; and a guide member disposed at a back surface of the main body, the guide member comprising a plate member and side-surface members extending from opposite side surfaces of the plate member, wherein each of the side-surface members has an inclined shape in which an entire surface of the side-surface member facing the cover is inclined toward the back surface of the main body, wherein the plate member comprises a plurality of penetration grooves, wherein the mounting member is positioned in the plurality of penetration grooves to mount the cover to the main body.

9. A display apparatus comprising: a display; a main body on which the display is mounted; a cover; a mounting member configured to separably mount the main body to the cover; a guide member disposed at a back surface of the main body, the guide member comprising a plate member and side-surface members extending from opposite side surfaces of the plate member, wherein each of the side-surface members has an inclined shape in which an entire surface of the side-surface member facing the cover is inclined toward the back surface of the main body; and a speaker, wherein the plate member comprises a plurality of receiving grooves, and the speaker is disposed on the plurality of receiving grooves.

10. The display apparatus of claim 9, wherein the speaker comprises:
    a speaker unit which outputs sound; and
    an enclosure accommodating the speaker unit.

11. The display apparatus of claim 9, wherein the cover comprises a plurality of slits in an area corresponding to the side-surface members of the guide member.

12. The display apparatus of claim 9, further comprising an additional speaker outputting sound in a direction different from a direction of sound output by the speaker.

13. The display apparatus of claim 9, wherein a back surface of the speaker and a back surface of the plate member are coplanar.

14. The display apparatus of claim 10, wherein the speaker further comprises a metal plate disposed between a front surface of the speaker unit and the enclosure.

* * * * *